United States Patent [19]

Millard

[11] Patent Number: 4,474,441
[45] Date of Patent: Oct. 2, 1984

[54] METHOD AND APPARATUS FOR CONTROLLING EXPOSURE BY SELECTIVE USE OF BLOCKING VISIBLE FILTER

[75] Inventor: John B. Millard, Cohasset, Mass.

[73] Assignee: Polaroid Corporation, Cambridge, Mass.

[21] Appl. No.: 204,045

[22] Filed: Nov. 4, 1980

Related U.S. Application Data

[63] Continuation-in-part of Ser. No. 127,120, Mar. 4, 1980, abandoned.

[51] Int. Cl.³ .................................... G03B 11/00
[52] U.S. Cl. .............................. 354/413; 354/411; 354/476
[58] Field of Search .................... 354/27, 33, 42, 49, 354/59, 145

[56] References Cited

U.S. PATENT DOCUMENTS

| Re. 27,461 | 8/1972 | Harvey . | |
|---|---|---|---|
| 1,866,581 | 7/1932 | Simjian . | |
| 2,086,791 | 7/1937 | Presler . | |
| 2,585,245 | 2/1952 | Harrison . | |
| 2,926,562 | 3/1960 | Bretthauer . | |
| 3,035,503 | 5/1962 | Lee . | |
| 3,045,124 | 7/1962 | McKinlay, Jr. | 250/226 |
| 3,173,347 | 3/1965 | Stimson et al. . | |
| 3,208,363 | 9/1965 | Easterly et al. . | |
| 3,270,638 | 9/1966 | Anwyl et al. . | |
| 3,314,349 | 4/1967 | Koeber, Jr. . | |
| 3,397,023 | 8/1968 | Land | 350/160 |
| 3,465,656 | 9/1969 | Wick et al. . | |
| 3,468,228 | 9/1969 | Rogers . | |
| 3,500,730 | 3/1970 | Matsubara et al. . | |
| 3,536,408 | 10/1970 | Norwood | 356/219 |
| 3,547,017 | 12/1970 | Harvey . | |
| 3,583,299 | 6/1971 | Land . | |
| 3,623,411 | 11/1971 | Gunther et al. . | |
| 3,661,466 | 5/1972 | Stimson et al. | 356/217 |
| 3,672,281 | 6/1972 | Land . | |
| 3,708,631 | 12/1972 | Schulman . | |
| 3,709,615 | 1/1973 | Blakeslee et al. | 356/224 |
| 3,723,003 | 3/1973 | Vockenhuber et al. | 356/4 |
| 3,792,649 | 2/1974 | Douglas | 354/192 |
| 3,832,722 | 8/1974 | Douglas | 354/29 |
| 3,856,418 | 12/1974 | Levin . | |
| 3,864,701 | 2/1975 | Krause | 354/49 |
| 3,896,458 | 7/1975 | Johnson et al. | 354/30 |
| 3,903,413 | 2/1975 | Manning | 250/226 |
| 3,917,395 | 11/1975 | Ogawa | 354/23 D |
| 3,942,183 | 9/1975 | Manning | 250/226 |
| 3,942,184 | 3/1976 | Blinow et al. | 354/42 |
| 3,963,333 | 6/1976 | Muellar et al. | 352/72 |
| 4,040,070 | 8/1977 | Hochreiten et al. | 354/59 |
| 4,040,072 | 8/1977 | Johnson et al. | 354/173 |
| 4,065,778 | 12/1977 | Harvey | 354/25 |
| 4,104,653 | 8/1978 | Johnson et al. | 354/27 |
| 4,150,888 | 4/1979 | Filipovich | 354/25 |
| 4,155,029 | 5/1979 | Yamaoka | 315/151 |
| 4,156,564 | 5/1979 | Tsunekawa et al. | 354/59 |
| 4,160,588 | 7/1979 | Beach | 354/31 |
| 4,230,400 | 10/1980 | Wick et al. | 354/25 |
| 4,256,391 | 3/1981 | Kitaura | 354/33 |
| 4,256,995 | 3/1981 | Ishida | 315/241 P |
| 4,304,476 | 12/1981 | Bloom | 354/49 |
| 4,316,659 | 2/1982 | Daniels | 354/42 |
| 4,358,186 | 11/1982 | Johnson et al. | 354/59 X |

FOREIGN PATENT DOCUMENTS

3036522 4/1981 Fed. Rep. of Germany .

OTHER PUBLICATIONS

The Polaroid Newsletter, "Plummer's Knowledge of Infrared Light Leads to 600's Automatic Exposure System", by Susan Lawrence, Feb. 1983, p. 7.

*Primary Examiner*—G. Z. Rubinson
*Assistant Examiner*—W. J. Brady
*Attorney, Agent, or Firm*—Leslie J. Payne

[57] ABSTRACT

Method and apparatus for automatically controlling exposure of a photographic film by evaluating non-visible spectral scene light frequencies. Particularly for artificially lit scenes, an evaluation of predominantly infrared frequencies is preferred. In one embodiment, the IR scene lighting is evaluated under control of the shutter aperture system while in another embodiment, the strobe itself is controlled by its own photodetector responsive to IR scene light.

47 Claims, 9 Drawing Figures

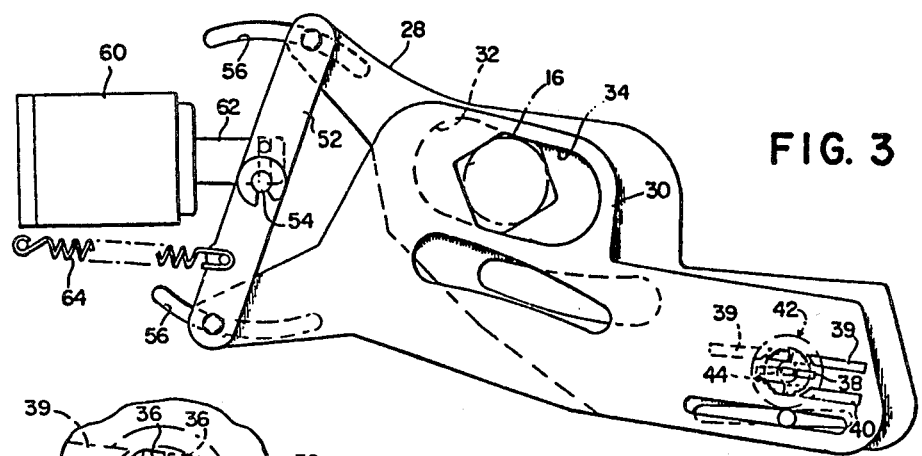
FIG. 3
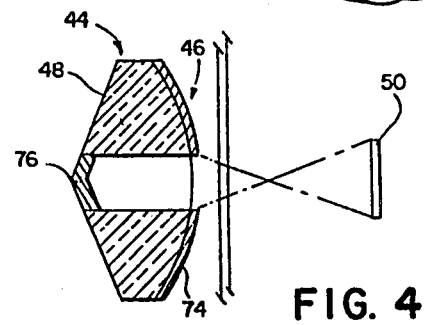
FIG. 3A
FIG. 4
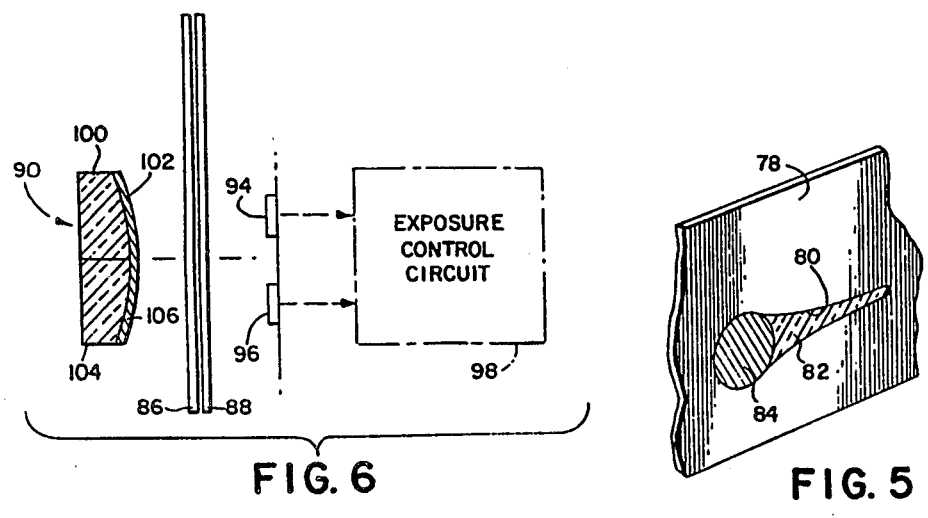
FIG. 6
FIG. 5

METHOD AND APPARATUS FOR CONTROLLING EXPOSURE BY SELECTIVE USE OF BLOCKING VISIBLE FILTER

RELATED APPLICATION

This is a continuation-in-part application of copending application Ser. No. 127,120, filed Mar. 4, 1980, by John B. Millard, which is in common assignment herewith and is now abandoned.

BACKGROUND OF THE INVENTION

This invention relates generally to the photographic field and, more particularly, an improved method and apparatus for controlling a photographic exposure responsive to evaluation of scene radiation of selected non-visible frequencies of scene radiation.

Automatic light responsive control systems are well known in the photographic arts. Essentially, these systems evaluate scene brightness levels of illumination for controlling exposure parameters, including effective aperture size and exposure interval, as a function of scene brightness evaluated against the sensitometric characteristics of the film being used. Typically, scene brightness evaluation is performed with light-measuring circuits including one or more photoresponsive elements.

One such automatic exposure control system employs scanning type shutter blades. Exemplary scanning shutter blades usable in exposure control systems are generally disclosed in U.S. Pat. No. 3,942,183, issued Mar. 2, 1976, to George D. Whiteside; and U.S. Pat. No. 4,104,653, issued Aug. 1, 1978, to Bruce K. Johnson et al., all of which are presently assigned with the present application. As described in these patents, there are cooperating pairs of primary and secondary apertures formed in the shutter blades. These pairs of apertures cooperate respectively for blocking and unblocking the passage of light through an exposure opening to a film plane and through a photocell opening to a light sensing or photoresponsive cell used for controlling blade positioning. During the exposure cycle, the secondary apertures operate in conjunction with the photocell and a control circuit to define both the aperture values achieved and the exposure interval as a function of the amount of light received through the secondary apertures. In such systems, photoresponsive elements of the silicon type are commonly used because they, among other things, have excellent long term stability and linearity of output signal with input light power changes.

For optimizing the quality of the resultant photographs when using automatic exposure control systems, such as the type noted, it is known to employ spectral correction filters to correlate the spectral sensitivity curve of the photoresponsive element more closely with that of the photographic color film. Without such a filter, the photocell would react to the scene frequencies, such as infrared (IR), and cause the control circuit to terminate exposure earlier than desired. This is especially the case when the photocell is of the silicon type because such a photocell tends to be red (IR) sensitive. For providing the desired correction, a spectral correction filter is interposed in the photocell's optical path, for example, as decribed in U.S. Pat. No. 3,903,413, issued on Sept. 2, 1975, to Monis J. Manning; and commonly assigned with the present application. This patent discloses use of a silicon photodiode, sensitive to radiant energy between about 350 nm and 1200 nm, whereas the sensitivity of typical color photographic film is confined to the visible region of the spectrum, i.e., from about 400 nm to about 700 nm. Use is made of a spectral correction filter with peak absorption in the near-infrared region (700–1200 nm) and high transmission in the visual region to correct or generally match the spectral response of the photocell in relation to the film. This matching of sensitivities is particularly useful in cameras employing diffusion transfer photographic processes of the so-called "instant photography" type where errors in the exposure cannot be later compensated for as is possible with film subsequently developed in a photographic laboratory.

As disclosed in U.S. Pat. No. 4,040,070, issued on Aug. 2, 1977, to W. Hochreiter et al., a spectral correction filter is removed from the photocell's optical path when the flash mode is desired. This removal is achieved, upon attaching a flash unit to the camera, by actuation of a relatively complicated mechanical arrangement which swings the filter out of the optical path.

Still other known prior art is described in U.S. Pat. No. 3,468,228, issued on Sept. 23, 1969, to Howard G. Rogers, which provides automatic sequential positioning of a pair of dual filters over both photocell and exposure apertures to attain a color balance exposure of photosensitive material.

SUMMARY OF THE INVENTION

In accordance with the present invention, there are provided an improved method and apparatus which automatically control exposure of an image recordable material in accordance with an evaluation of selected spectral scene light frequencies in which the contribution to the evaluation of visible frequencies is reduced relative to the contribution of other spectral frequencies thereto.

In one illustrated embodiment of this invention, an image recording system is provided having means for producing a pulse of illumination, means for mounting image recordable material at a given focal plane, means for directing image forming light rays from the scene along a given path to the focal plane, means for unblocking and blocking passage of scene light along the path, means for evaluating essentially infrared radiation from the scene during at least a portion of an evaluation period, and means responsive to the evaluating means for controlling the unblocking and blocking means to define a suitable exposure of the film. In this arrangement, evaluation of infrared frequencies is provided generally contemporaneously with an artificial pulse of illumination.

In an alternate embodiment, the pulse of illumination itself is controlled by evaluation of essentially infrared frequencies from the scene.

Among the objects of the invention are, therefore, the provision of an exposure control system providing an improved evaluation of scene conditions particularly under artificial illumination, the provision of an improved photographic camera employing the last noted exposure control system, the provision of an improved artificial lighting arrangement, and the provision of an improved method for control of an exposure or scene lighting during exposure.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 3 is an elevational view diagrammatically depicting the blade mechanism of the camera of FIG. 1 in a scene light admitting arrangement;

FIG. 3A is an enlarged fragmented view diagrammatically depicting the photocell aperture arrangement of FIG. 3;

FIG. 4 is a diagrammatic side view illustrating the arrangement of the photocell lens, the shutter blades and a spectral filter provided in the camera of FIG. 1;

FIG. 5 is a diagrammatic view illustrating an alternate filter arrangement which can be utilized in the camera of FIG. 1;

FIG. 6 is a diagrammatic view illustrating an exposure control system embodying dual photocells and dual spectral filters;

DETAILED DESCRIPTION

This invention relates to an improved exposure control system, wherein the contribution of visible frequencies from the scene relative to other spectral frequencies being evaluated is reduced. This is particularly true in flash mode situations. The embodiment to be described uses a dual spectral filter arrangement. One filter blocks visible frequencies, but passes infrared frequencies, while the other filter functions in the reverse manner by blocking infrared frequencies but passing visible frequencies. The instant invention is directed to and claims use of the first mentioned filter in an exposure control system during a portion of the exposure interval. This is to be contrasted to the invention described and claimed in copending application Ser. No. 108,547, now U.S. Pat. No. 4,358,186 entitled "Method and Apparatus For Controlling Exposure By Selective Use Of Blocking Filter", filed Dec. 31, 1979, by Bruce K. Johnson and John B. Millard, which broadly claims use of both types of spectral filters during different portions of the exposure interval. Thus, while the illustrated embodiments in both applications are substantially similar, each application differs because the claimed subject matter is different.

Figure 1:
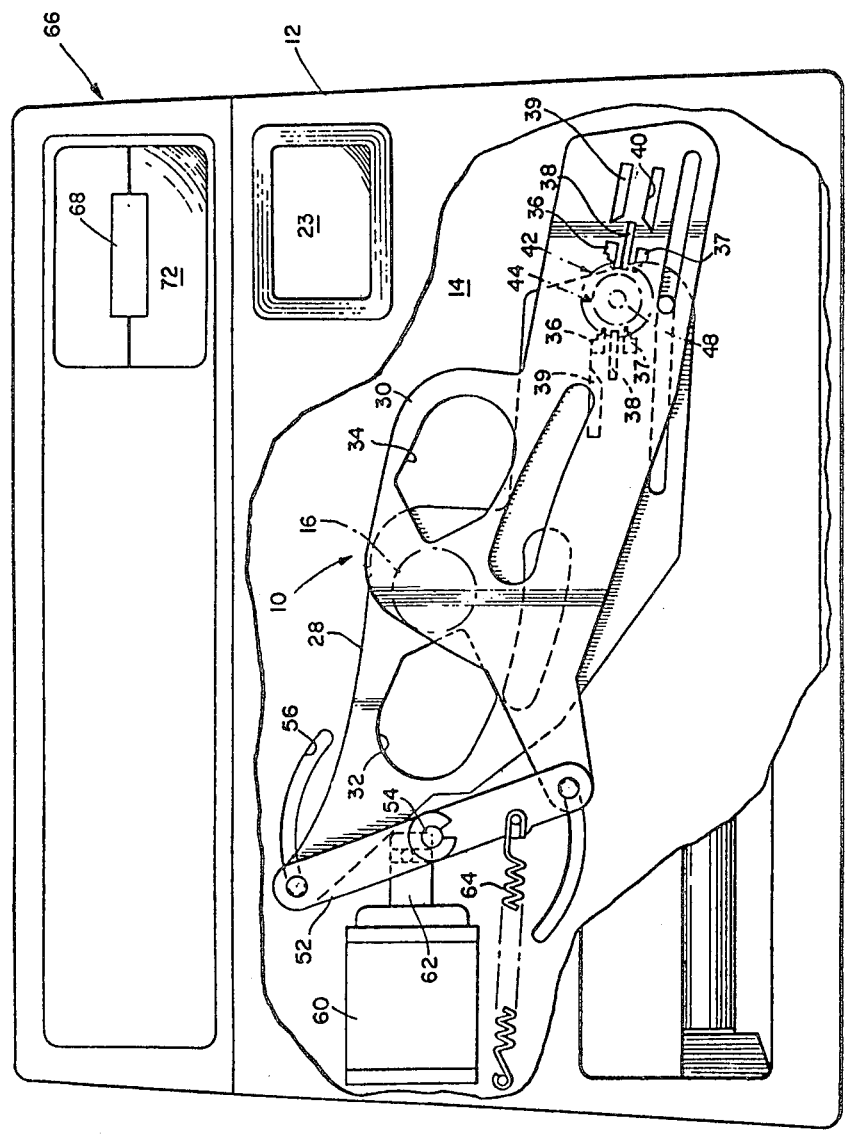
FIG. 1 is a front elevational view diagrammatically depicting a photographic camera embodying an improved exposure control system with a blade mechanism in a scene light blocking arrangement.
Figure 2:
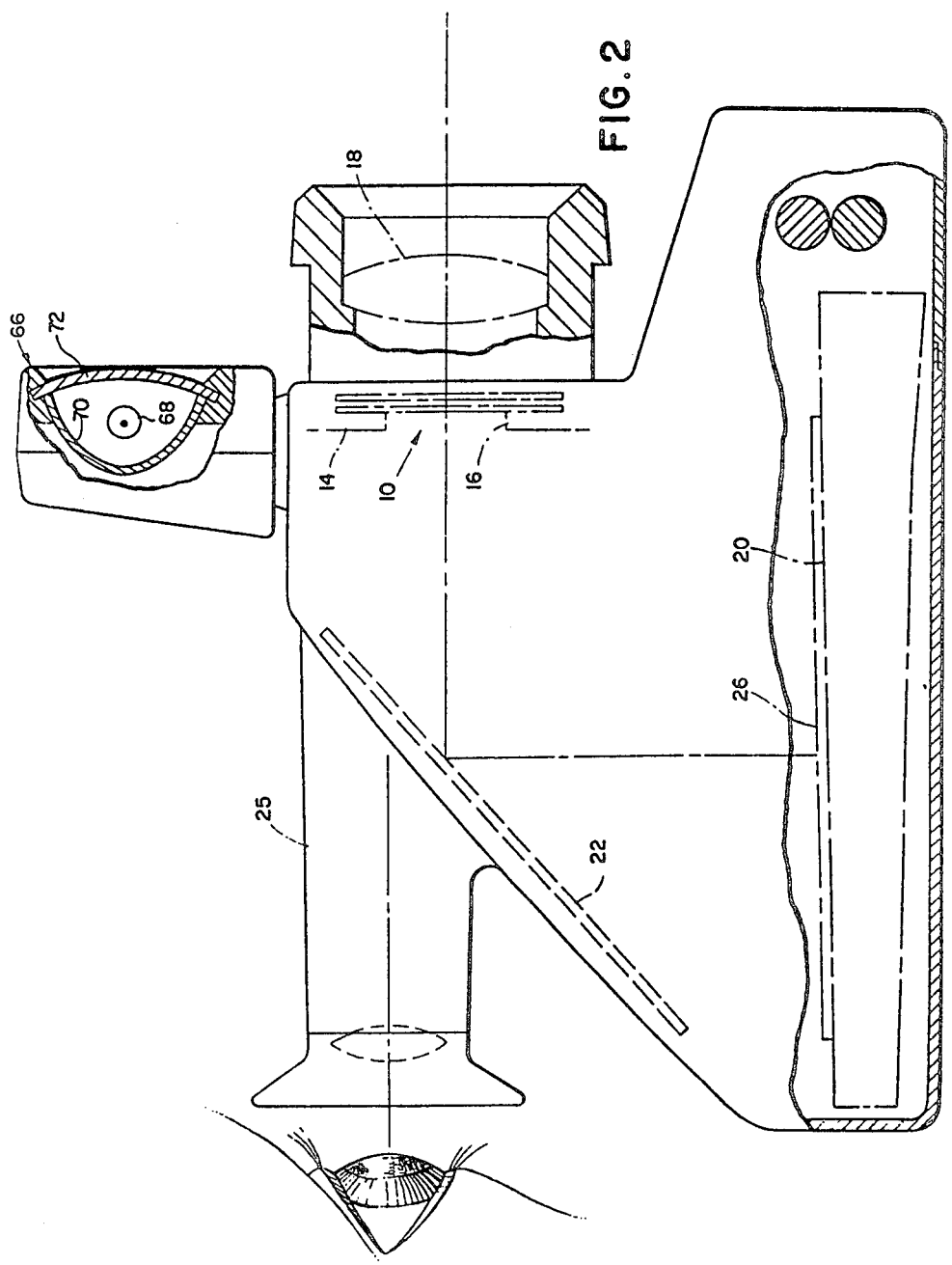
FIG. 2 is a side elevational view of the photographic camera shown in FIG. 1.

Referring now to FIGS. 1 and 2, there is shown generally at 10 a photographic exposure control system. The system 10 is disposed in camera housing 12 and is operatively connected to a baseblock casting 14 which is selectively machined for supporting various components of this system. Disposed centrally within the casting 14 is a light entry exposure opening 16 defining the maximum available exposure aperture for the system. Provided in overlying relation to the light entry opening 16 is an objective or taking lens 18 for focusing image carrying rays through the light exposure opening. In this embodiment, the taking lens 18 may be of the fixed focus type. Variable focus lens systems, in lieu of the fixed focus kind, may also be provided. Image carrying rays from the scene to be photographed are directed by the taking lens 18 rearwardly to a photographic film unit (not shown) of a film pack 20 by way of a reflecting mirror 22 stationed in a suitable light-tight film exposure chamber 24. Each of the film units of the film pack 20 is successively positioned at the focal plane 26 of the camera. Examples of such a film pack 20 are described in U.S. Pat. Nos. 3,543,662; 3,705,542; 3,748,484; 3,779,770; and 4,040,072.

Although the above exposure control system 10 has been described for use with photographic cameras of the non-reflex type, the intended scope of this invention is by no means so limited. Accordingly, cameras of the well-known reflex type, such as described in U.S. Pat. No. 3,672,281, entitled "Reflex Camera", by E. H. Land, commonly assigned herewith, may be equally suitable for embodying the exposure control system of this invention.

Additionally, a viewing window 23 is located in the front face of the camera housing 12 and operates in conjunction with a viewing system 25 for permitting viewing and framing of the scene to be photographed by the operator.

As best shown in FIG. 1, intermediate the objective lens 18 and the light entry exposure opening 16 is provided a shutter blade mechanism comprising two overlapping shutter blade elements 28 and 30 of the so-called "scanning type" which will be subsequently described in greater detail herein. A pair of scene light admitting primary apertures 32 and 34 are provided respectively in the blade elements 28 and 30 to provide overlapping relationship to the light entry exposure opening 16 and thereby to cooperatively define a progressive variation of effective aperture values thereat in accordance with simultaneous longitudinal and lateral displacement of one blade element with respect to the other blade element. Such kind of displacement is fully described in U.S. Pat. No. 3,942,183, entitled "Camera With Pivoting Blades", by George D. Whiteside, issued Mar. 2, 1977, in common assignment herewith and now incorporated by reference herein.

Each of the shutter blades 28 and 30 additionally include a plurality of secondary apertures. In the illustrated embodiment, a plurality of sets of sweep secondary apertures are generally indicated by reference numerals 36, 37, 38, 39, 40. Reference is made to copending applications Ser. No. 108,219, now U.S. Pat. No. 4,351,593 entitled "Method and Apparatus For Selective Positioning Of Spectral Filter During Exposure Control", by Bruce K. Johnson et al., filed Dec. 31, 1979, and Ser. No. 108,546, entitled "Method and Apparatus For Selective Positioning of Spectral Filter During Exposure Control", by Bruce K. Johnson, filed Dec. 31, 1979; which are assigned in common herewith, for describing in detail the structure and operation of the shutter blades and sweep apertures for controlling passage of light to a light detecting station 42. Thus, only those details thereof necessary for an understanding of the present embodiment will be set forth. Essentially, the sets of secondary apertures 36, 37, 38, 39, 40 move in correspondence with the primary apertures 32, 34 and progressively with each other for defining progressively varying and distinct sets of secondary aperture values as a function of blade positioning during exposure. Also, there sweep apertures cooperatively coincide with a photoresponsive device or photometer 44 including spectral filter system 46 for effectively and automatically controlling the intensity and spectral frequency of scene light passing to the light detecting station 42 as a function of shutter blade positioning during an exposure interval.

This photometer 44 is aligned with a photocell light entry window (not shown) in the housing 12. Preferably, the photometer 44 includes a photocell lens 48 and a photodetector 50 of the silicon photodiode type. Also, included in the light detecting station 42 is a control circuit (not shown) for collectively operating with the photometer 44 for effecting termination of the exposure interval as a function of time integration of the intensity of light incident upon the photodetector 50 as permitted by the overlapping sets of photocell sweep apertures 36–40. Also, the above-described light detecting station 42 is described in the last noted copending U.S. patent applications and does not, per se, form an aspect of the invention. Hence, only those details needed for an understanding of the present invention will be given.

Returning to a brief description of the shutter blade mechanism, it will be understood that distal ends of the shutter blades 28, 30 are pivotally connected to distal ends of a walking beam 52. In turn, the walking beam 52 is pivotally connected to the block casting 14 by a pivot pin 54 and its distal ends have pin members extending through respective openings in the respective blade elements which pins slidably engage respective arcuate slots 56 formed in the casting 14 for prohibiting shutter blade disengagement during exposure control operations.

Displacement of these shutter blades 28, 30 relative to each other and to the photocell lens 48 and thus to the spectral filter system 46 is provided, in part, by a tractive electromagnetic device or solenoid 60. Included in such solenoid 60 is an internally arranged and movable cylindrical plunger unit 62 which is affixed to the walking beam 46 and retracts upon solenoid energization. Thus, longitudinal displacement of the plunger unit 62 is effective for rotating the walking beam 52 about the pivot pin 54. In so doing it causes appropriate displacement of the shutter blades 28, 30 in a known manner to a scene light blocking condition (FIG. 1). For continuously urging the primary apertures 32, 34 and the sets of secondary sweep apertures 36–40 to positions defining their effective aperture values, there is provided a biasing spring 64. Thus, when the solenoid 60 is deenergized, the spring 64 drives the blades 28, 30 toward their maximum open position.

For purposes of battery power conservation, there is provided a latch mechanism (not shown) operable automatically at the end of each exposure for latching the walking beam 52 in the scene light blocking position shown in FIG. 1. Hence, the solenoid 60 is deenergized when the blades 28, 30 are in the scene light blocking condition. Unlatching of the latch mechanism commences upon exposure. Details of this latching mechanism including its operation do not, per se, form an aspect of this invention; therefore, reference is made to U.S. Pat. No. 4,040,072, issued Aug. 2, 1977, and assigned in common herewith for a more complete description thereof.

Reference is now made to the flash strobe unit 66 of the present embodiment. In essence, the electronic flash strobe unit 66 is cooperatively associated with the photographic camera apparatus to contribute a predetermined proportion, i.e., fill flash of the scene light admitted by the shutter blade mechanism to expose the film in a manner to be subsequently described. Since the operation and structure of this fill flash do not, per se, form an aspect of the present invention, only those details necessary for an understanding of the present invention will be described. For a more detailed description of this electronic flash apparatus and its cooperation with the scanning shutter blades 28, 30, reference is again made to the last noted applications. The electronic flash strobe unit 66 is affixed to an upper surface of the camera housing 12. Included in the unit 66 is a flash discharge tube 68 located in a suitable reflector 70 behind a lens 72. A quench tube (not shown) is provided for interrupting the flash discharge of the flash discharge tube 68 and electric power for the electronic flash strobe unit 56 is provided by a battery (not shown) carried in the film pack 20. Briefly, as described in the above-mentioned application, the output signal from a light integrator circuit (not shown) of the scene light detecting station 42 is directed to three level detector circuits (not shown) which all may be a well-known design, such as a Schmidt trigger. The output from one of these level detectors controls a flash fire trigger circuit (not shown) of the electronic strobe unit 66. The second level detector is effective to control the energization of the solenoid 60, and the third level detector is effective to control a flash quench circuit (not shown). Also, a flash time delay circuit (not shown), which receives an input signal upon the deenergization of the solenoid 60, is included to provide a time delayed flash fire signal operative to trigger the flash under very low ambient light conditions as later explained in the last noted applications. The time delay provided by the flash delay circuit may be in the order of 65±4 msec. Finally, a shutter time out circuit (not shown) is also provided as described in the last-noted copending application.

Specific reference is made to FIG. 4 for describing the photocell 44 in greater details. The photocell lens 48 is linearly spaced from the silicon photocell detector 50, the latter of which produces a current output responsive to incident scene radiation thereon. In the illustrated embodiment, the photocell lens 48 is of the focusing type and is in optical alignment with the photocell light entry window (not shown) in the front face of the camera housing 12. Positioned intermediate the photocell lens 48 and the silicon photocell detector 50 is the pair of scanning shutter blades 28, 30. Positioning of the shutter blades 28, 30 relative to the photocell lens 48 is carried out to insure that the secondary sweep apertures 36–40 direct preselected portions of spectrally filtered scene radiation passing through the filter system 46 to the photodetector 50 for purposes subsequently explained.

For purposes of carrying out the selective attenuation of spectral energy in accordance with this invention, the spectral filter system 46 includes an annular coating 74 on the rear face of the photocell lens 48 for blocking infrared radiation (IR), but passing visible light frequencies. Also, the IR filter can be dispersed inside the lens 48. This coating 74 is in the form of an annulus, such as best observed from FIG. 3A. Such filtering system 46 includes in a hollow center portion of the photocell lens 48 a blocking visible lens filter 76 which allows IR radiation to the photocell detector 50, but serves to substantially block the visible spectral frequencies. The significance of this relationship in modifying exposure control will be explained subsequently.

Referring back to the blocking IR filter 74, it is fabricated to attenuate spectral energy within the broad wavelength range to which the photodetector 50 is sensitive (e.g., 360–1200 nm) and, preferably, to remove substantially all the spectral energy in the near IR region (e.g., 700–1200 nm) of the photocell range. Thus, visible spectral energy remains after passing the IR filter 74. On the other hand, the visible blocking filter 76 is fabricated of material for attenuating spectral energy within the visible spectrum range (i.e., 400–700 nm) such that infrared radiation is permitted to pass to the photodetector 50, while the visible light is precluded. However, both filters 74 and 76 can leak IR frequencies and visible frequencies; respectively. That is, while essentially complete blocking of the visible frequencies for artificial illumination evaluation is preferred, any reduction in the relative contribution to the evaluation of visible light versus infrared is advantageous.

Prior to describing the improved spectral filtering for exposure control in detail, it should be first explained that the novel arrangement of the photocell lens 48, the spectral filters 74, 76 and the sweep apertures 36–40 automatically provide alternate IR and visible light absorptive filtering of the scene radiation input to the photodetector 50 during stroke of shutter blades 28, 30. It is intended that at moderate-to-high light levels, the scene light being passed to the photodetector 50 is subjected to the blocking IR filters 74. This is desired since the ambient contribution is most important under such conditions and, therefore, control of IR radiation is important. Under lower levels of scene brightness and greater blade scan movement, as will be explained, the IR frequencies are passed on to the photodetector 50 while the visible light frequencies are blocked. This minimizes the adverse affect widely disparate reflectivity values, in the visible range, have in exposure.

Broadly, the secondary apertures 36–40 operate in conjunction with the filter system 46 and lens 48 to provide means for substantially permitting transmission of selected frequencies, such as visible, while blocking transmission of other selected frequencies, such as infrared, during an earlier portion of blade scan and, hence, the exposure interval, while precluding transmission of the previously transmitted frequencies during a later portion of blade scan and simultaneously blocking the previously transmitted frequencies when the scan causes larger aperture values as under low light conditions.

Operation of a camera actuator button (not shown) powers up the camera and enables the strobe unit 66 for subsequent firing and effects release of the shutter latch mechanism to allow shutter blade movement to commence the exposure cycle. More specifically, the shutter blades 28 and 30 move in opposite directions from the scene light blocking condition of FIG. 1 toward a maximum primary aperture value, such as shown in FIGS. 3 and 3A. Thus, the effective aperture area over the light entering exposure opening 16 is enlarged progressively. Simultaneously, the secondary photocell sweep apertures likewise define corresponding progressively varying secondary effective aperture values relative to the light in detecting station 42.

During the sweep of the shutter blades 28, 30 in the scene light admitting condition shown in FIG. 3, each of the pairs of sweep apertures 36, 37 respectively progressively coincide, to initially allow only that scene light which passes through the annular filter 74 to reach the photodetector 50. It is pointed out that this blade mechanism condition is not depicted in the present application but is shown in the last noted copending applications. In such condition, the blocking IR filter 74 serves to essentially block the IR, while the opaque portions of the shutter blades 28, 30 block passage of unfiltered light through the central lens filter portion 76. Of course, the IR filter 74 passes the visible frequencies. It is envisioned that this relationship of the shutter blades 28, 30 and the IR filter 74 occurs during high ambient light conditions and corresponds to relatively small primary aperture values. With the scene light being filtered by the IR filter 74, the potential of overexposing blue sky is eliminated. In this embodiment, a flash will be fired during such an exposure and the reflected light from such flash evaluated without the desired benefit of IR radiation; however, since the flash contribution under these levels of ambient light is not controlling, the lack of precise flash accuracy is tolerated in favor of ambient control.

Under conditions wherein ambient light is lower, the photocell detector in cooperation with the light integrating circuit will not reenergize the solenoid 60 until a still later time such that the shutter blades 28, 30 sweep beyond their above-described position and move to the position shown in FIG. 3A. In doing so, the central secondary sweep apertures 38 progressively coincide over the blocking visible filter 76 to thereby define secondary aperture values which allow transmission of infrared spectral energy to the photocell detector 50, but essentially exclude the visible spectral energy. It will be appreciated that at this time, the apertures previously defined by the sweep apertures 36, 37 are eliminated. Hence, only scene light passing the central blocking visible filter 76 reaches the photocell detector 50. This blocking of visible frequencies continues until the aperture values defined by the secondary sweep apertures 38 scan beyond their position depicted in FIG. 3A. The latter occurs when the level of scene brightness is still lower than that which dictates the blade position in FIG. 3 and the subject is beyond the effective flash range. As later explained in more detail, the secondary aperture pair 39 cooperate with the detector 50 to again block IR evaluation at this point.

Since, under high ambient light conditions, the blade scan is terminated early, only the sweep apertures 36 and 37 provide aperture values over the photocell. Hence, the absorption filter 74 blocks, or precludes transmission of, IR radiation from the scene at such time. However, with lower ambient light levels, the secondary apertures 38 come into coincidence over the blocking visible filter lens 76 (while apertures 36 and 37 pass out of coincidence) as larger exposure values are formed. Accordingly, the shutter blades 28, 30 move to the position shown in FIG. 3 where the blocking visible filter 76 is employed for controlling spectral energy transmission to the photocell. Consequently, in this embodiment, the scene light incident upon the photodetector is selectively filtered to block IR during the initial portion of the displacement of the shutter blades 28, 30 or that is, an initial portion of the exposure interval and then becomes filtered relative to visible light as opening 38 coincides so that the photocell then responds to primarily IR radiation during this subsequent portion of the displacement.

Hence, it should be understood that the filter system in conjunction with the blade mechanism provide means for automatically permitting transmission of visible light frequencies to the sensing or detecting means during at least one portion of the displacement of the blade mechanism or, that is, one portion of the exposure interval while reducing and preferably substantially precluding transmission of the visible frequencies versus IR to the sensing means during another portion thereof.

Consequently, in accordance with the present invention when the flash unit 66 is fired in situations of somewhat low ambient scene light (where the flash contribution to the resulting photograph is predominant as compared to the ambient contribution), the shutter blades 28, 30 will, during scanning, be positioned during the strobe flash with apertures 38 in coincidence so that the blocking visible filter 74 is in spectral filtering relationship to the photodetector. Thus, the photocell 44 is only responsive to the IR radiation at this time. As a result, preferably during the early stages of blade displacement, only visible light will be incident upon the photodetector while at the later stages, where flash control is more vital, IR radiation is essentially evaluated, such that the earlier mentioned difficulties encountered with flash exposure control will be substantially overcome. In this regard, objects viewed in the visible spectral region exhibit widely different light reflectivities while in contrast the near infrared region (e.g., 750–1200 nm) is characterized by relatively more uniform reflectivity for most common materials. Therefore, the IR reflectivity is much less dependent on the visible color (specific visible light absorption), and objects viewed by infrared are relatively independent of the reflectivity disparities earlier described. Thus, in scenes where differences in the visible reflectivities are present or which can be exaggerated by light sources such as flash bulbs or strobes, it is highly desirable to essentially evaluate the IR radiation because, with such IR radiation, there will be less reflectivity differences between, for example, a subject's facial skin and the surrounding clothing or other objects. This substantially minimizes the degree of under or overexposure in such situations. It is, therefore, apparent that under flash conditions with exaggerated scene differences in reflectivities it is desirable to have the photocell detector respond to IR radiation.

Advantageously, in operation under high ambient light conditions, where the blades reach only small scanning aperture values, the novel system essentially precludes IR photocell reception and hence, IR evaluation. However, with lower ambient conditions, as the scan begins to reach larger aperture values, it reduces and subsequently eliminates IR filtering to provide reception wherein the visible light is blocked. Since the flash is usually fired at later rather than early stages of the scan, flash firing which assumes greater importance under lowered ambient conditions is thus generally coincident with the blocking visible filtered reception. Consequently, for this lower ambient condition, the initial, primarily ambient portion of the exposure interval is evaluated under essentially only visible light while during the flash portion of the interval the evaluation employs essentially infrared scene radiation.

Finally, it is to be understood that the secondary sweep apertures 39, 40 are arranged to travel in overlying relation to the photocell lens 48 in general and the IR filter 74 in specific during final scanning of the blades 28, 30 to a terminal position, not shown. During this final stage of such scanning, the photocell detector is again made essentially responsive to the visible radiation rather than IR frequencies since this blade mechanism position occurs when there is predominantly low ambient light and where the subject is beyond the effective range of the flash; for example, when taking pictures of the Grand Canyon with objects in the scene too remote to reflect a significant amount of the flash intensity. Under such conditions, it is preferred to return to scene evaluation of visible light while excluding IR radiation. Consequently, the IR absorption filter is preferred at this point for proper exposure.

It will be appreciated that the present invention can be used in a horizontally divided photocell lens having the top half poriton made so as to block or absorb IR frequencies while passing visible frequencies and the lower half portion made to pass IR and block visible frequencies. A horizontally split photocell lens of this type is disclosed and claimed in U.S. patent application Ser. No. 156,198, now U.S. Pat. No. 4,315,675 entitled "Method and Apparatus For Selectively Positioning Spectral Filter", filed June 3, 1980, by Bruce K. Johnson, and in common assignment herewith. It is again emphasized that the instant invention does not claim the noted split lens, but rather represents an embodiment in which the use of a blocking visible/passing IR filter can be utilized in an exposure control environment. The secondary sweep apertures would be, of course, formed so as to achieve the desired filtering control mentioned above during the shutter blade scan. In this regard, for example, under high ambient light conditions an initial pair of cooperating sweep apertures would cooperate over the blocking IR filtered lens half; under relatively low ambient light conditions, another pair of sweep apertures could coincide over the blocking visible lens half, while the first noted pair of secondary apertures would terminate or close their effective sweep aperture area. Should light conditions dictate that the blades continue to sweep beyond the condition last noted, such as under low or negligible ambient light and wherein the subject is beyond the effective range of the flash, then a third pair of coinciding sweep apertures could pass in overlying relation to the IR filter lens half while the noted second pair of sweep apertures close or terminate their effective sweep aperture area. Thus, it will be understood, of course, that the foregoing arrangement is designed to control the exposure as did the previously described arrangement.

Another embodiment is depicted in FIG. 5. This embodiment is a modification of that disclosed in copending application Ser. No. 110,811, now U.S. Pat. No. 4,325,616 entitled "Apparatus For Varying the Spectral Filter Over the Photocell As a Function Of Blade Position", by Milton S. Dietz, and filed Jan. 10, 1980. Again, this embodiment is being described because it illustrates another embodiment in which the blocking visible filter 84 can be used particularly under low amibient light conditions in which a strobe will be fired. Therefore, only a description of those components necessary for an understanding thereof will be given insofar as more specific structural and operational characteristics thereof are described in the last noted application and are incorporated herein by reference. In essential respects, the presently described embodiment includes a pair of shutter blades, only one of which is shown at 78. The blade 78 is similar to that described in the noted application. With respect to the secondary sweep aperture 80, it includes an infrared blocking filter 82 at the leading portion thereof and differs from that described in the noted copending application by virtue of its use of a generally circular visible filter 84 positioned in a generally circular opening defined by the aperture and adjacent the blocking IR filter 82. In this last noted application, the space presently occupied by the visible blocking filter 84 is without any filter. Of course, with use of the blocking visible filter 84, the photocell will be responsive only to the incident infrared frequencies during that portion of blade scan which, as noted, occurs when the blocking visible filter 84 is in overlapping relationship to a photodetector during low or negligible scene light, whereby when the flash strobe is fired and the IR radiation with its relatively uniform reflectivity response, as compared to visible reflectivity responses, is evaluated for eventual control of blade positioning as well as for causing termination of the exposure interval.

Referring now to FIG. 6, there is shown another embodiment. This embodiment is a modification of that disclosed in copending application Ser. No. 108,381, entitled "Method and Apparatus Employing Dual Photocells For Removing Spectral Filter During Strobe Pulse", by Bruce K. Johnson, and filed Dec. 31, 1979. Again, this embodient is being described because it illustrates another arrangement on which the blocking visible filter 84 can be used particularly under low ambient light conditions in which a strobe will be fired. Therefore, only a description of those components necessary for an understanding thereof will be given insofar as the more specific structural and operational characteristics thereof are described in the last noted application and incorporated herein by reference. Essentially, this embodiment includes a pair of shutter blades 86, 88 spaced intermediate the photocell lens 90 and a pair of spaced apart photocell detectors 94, 96, preferably of the silicon photodiode type. Operatively connected to the dual photodetectors 94, 96 is the switching circuit (not shown), which controls operation of an exposure control circuit 98 in response to the firing of the flash, as described in greater detail in the last noted application. The scene light is controlled by the overlapping pairs of photocell sweep apertures (not shown).

The photocell lens 90 is preferably constructed as an integral unit, wherein top and bottom lens half portions direct the scene light to corresponding ones of photocell detectors 94, 96.

In the illustrated embodiment of FIG. 6, a different photometric response for each of the photocell detectors 94, 96 is achieved by virtue of the upper lens portion 100 having a spectral filter 102, preferably an IR absorption filter connected to a rear lens surface thereof, while a lower lens portion 104 has connected to a rear surface thereof a blocking visible light spectral filter 106 which passes infrared frequencies. It is preferred that the spectral filter 102 be a blocking infrared radiation filter of the type attenuating electromagnetic frequencies in the near IR region (e.g., 700–1200 nm), while the spectral filter 106 attenuates frequencies in the visible range of the spectrum (i.e., 400–700 nm). Thus, the upper lens portion 100 including the blocking IR filter 102 will transmit visible spectral energy to the exclusion of infrared spectral energy to the photodetector, whereas the lower lens portion 104 including the filter 106 will transmit infrared to the exclusion of visible frequencies.

As noted in the above application, duplicate pairs of secondary sweep apertures, control passage of scene light from the different lens portions 100, 104 to the corresponding photocell detectors 94, 96; respectively. Towards this end, the shutter blades 86, 88 are appropriately positioned relative to the photocell lens 90 to ensure that the pairs of secondary sweep apertures define essentially the same effective aperture values over each of the detectors. Thus, the top half of the photocell lens 100 serves in an opposite fashion than the lower half; namely, it would block infrared frequencies while serving to pass visible light frequencies. This latter step occurs, of course, during the strobe fire period. It will be understood that in this embodiment that during exposure and prior to the flash being fired the exposure control circuit 98 is responsive to the photodetector 94 while at the commencement of and during flash fire the control circuit 98 is responsive to the photocell detector 96. Termination of flash as described in the last noted application resets the switch circuit of the exposure control circuit. Thus, during the strobe pulse, the exposure control circuit is responsive to the photocell detector 96 receiving infrared frequencies to the substantial exclusion of visible light. The advantages of this approach are apparent from the description of the beneficial results obtainable by exclusive use of IR frequencies during the stobe fire.

Figure 7:
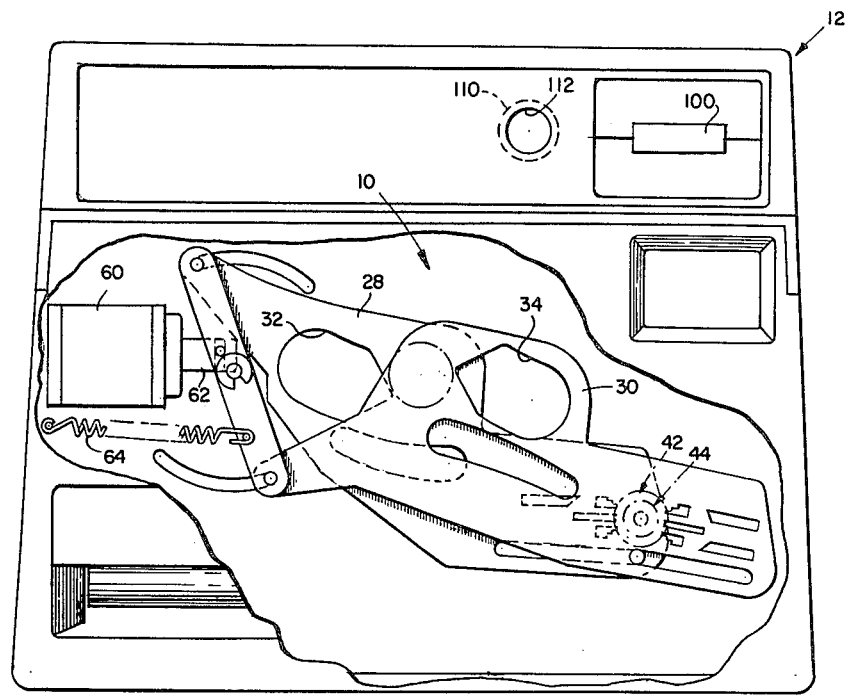
FIG. 7 is a front elevational view of a photographic camera system having an electronic flash arrangement embodying a flash control system in accordance with the invention.
Figure 8:
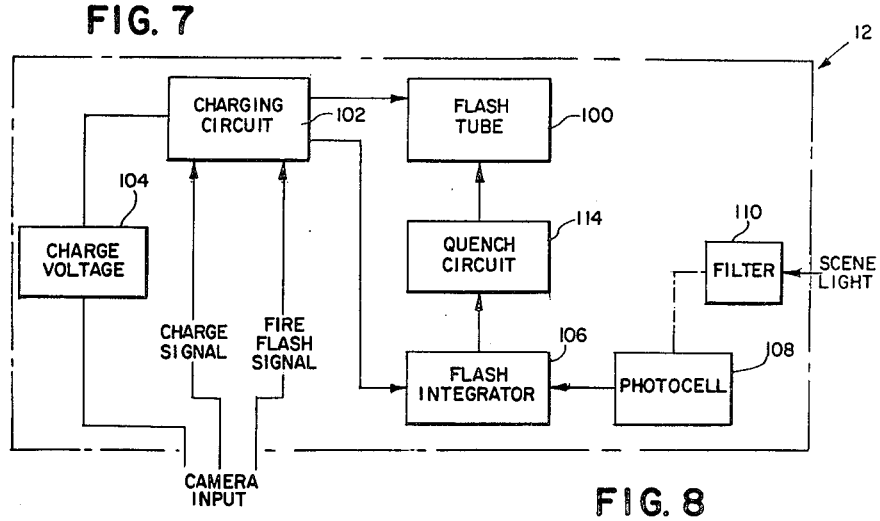
FIG. 8 is a block diagram of the flash arrangement illustrated in FIG. 7.

Reference is made to FIGS. 7 and 8 for purposes of illustrating another embodiment of the present invention. Basically, the improved spectral filtering features of this invention are utilized to control the flash unit 12 directly. This is essentially attained by regulating the flash fire pulse duration in accordance with the evaluated infrared frequencies. Broadly, firing of the flash tube 100 is achieved subsequent to a flash charge signal followed by a flash fire signal. The first signal emanates upon closure of suitable switching apparatus mounted on the camera. Examples of such a switch is disclosed in copending application Ser. No. 54,652, now U.S. Pat. No. 4,255,030 filed July 3, 1979, and in common assignment herewith. These switch actuators do not, per se, form an aspect of the present invention. Therefore, a detailed explanation thereof is unnecessary. Basically, the flash charge signal inputs the charging circuit 102 to thereby allow the latter to charge by a suitable source of electrical energy emanating from charge voltage 104. Subsequent to charging, the flash fire signal inputs the charging circuit 102 for causing the latter to energize the flash tube 100 for providing the desired pulse of artificial illumination. The flash fire signal can emanate from the camera's exposure control system mentioned above in connection with FIG. 1. Thus, the flash fire signal will be initiated when the output signal of the light integrator circuit (not shown) in the scene light detecting station 42 reaches a preselected value. Firing the flash under these circumstances facilitates attainment of the desired proportional fill-in flash mentioned above. Energizing the charging circuit 102 also energizes the flash integrator circuit 106. The integrator circuit 106 is similar to the integrating circuit used in the light detecting station 42. Thus, the flash integrator circuit 106 integrates the intensity of scene radiation incident on the photocell assembly 108 as a function of time. The photocell 108 may be of the silicon photodiode type and is in optical alignment with the spectral filter 110. This spectral filter 110 preferably blocks all the spectral frequencies in the visible range while transmits infrared frequencies, preferably, in the near infrared range. This invention also contemplates elimination of the filter 110 and use of a photocell which is sensitive exclusively to infrared frequencies. The spectral filter 110 has the same optical and transmissive properties as the spectral filter 76. Thus, it eliminates the visible spectral frequencies from being evaluted. Consequently, the filter 110 will transmit to the photocell 108 only infrared frequencies for ultimate evaluation by the flash integrator circuit 106. Towards this end, scene radiation reaches the spectral filter 110 from an access opening 112 (FIG. 7) provided in the front face of the flash unit 12. While in this embodiment, the spectral filter 110 blocks all visible frequencies, it is within the spirit and scope of this invention that the filter could reduce the contribution to the evaluation of visible frequencies of the scene relative to the other frequencies. Thus, the flash integrator circuit 106, photocell 108 and filter 110 provide a sensing means having means for reducing the contribution to the evaluation of visible frequencies from the scene relative to other spectral frequencies therefrom during at least a portion of the evaluation period.

To commence exposure, the operator actuates a flash charge switch (not shown) which operates to provide the charge signal to the charging circuit 102. The exposure cycle is initiated by manual actuation of the exposure initiation switch. Thereafter, the flash fire signal will be provided by the light detecting station of the camera. This flash fire signal inputs to the charging circuit 102 as as to operate it to cause flash firing. Reflected scene illumination including the reflected pulse of artificial illumination pass through the access opening 112 and is filtered by the filter 110 so as to be evaluated by flash integrator 106. As indicated earlier, the spectral filter 110 excludes all visible spectral frequencies, while transmitting the infrared frequencies. Thus, the intensity of the infrared frequencies will be integrated as a function of time by the flash integrator 106. Upon the latter reaching a predetermined voltage level, it will input the quench circuit 114. In turn, the quench circuit 114 operates to quench the flash tube 100. It will be appreciated that the quench circuit 114 will replace the quench circuit provided in the light detecting station of the camera. If the subject being photographed is relatively close to the camera, the intensity of reflected light will be such as to cause the predetermined voltage level to be reached sooner than if the subject were at a more remote distance. Accordingly, the pulse duration varies inversely with the distance of the subject. In this manner, exposure can be appropriately regulated during the flash mode.

The light integrating unit generally described above provides an evaluation of scene radiation during an evaluation period which, in the illustrated embodiment, occurs essentially simultaneous with at least the initial stages of the exposure interval. Further, since the light integration only continues until the preselected voltage level for flash quench is reached, the actual length of the evaluation period is determined by the scene radiation; however, it should be understood that novel arrangements described herein are also applicable to pre-evaluation of scene lighting and to fixed periods of evaluation.

Since certain changes may be made in the above-described apparatus without departing from the scope of the invention herein involved, it is intended that all matter contained in the description thereof or shown in the accompanying drawings shall be interpreted as illustrative and not in a limiting sense.

What is claimed is:
1. Image recording apparatus comprising:
   means for mounting image recordable material at a given focal plane;
   means for directing image forming light rays from the scene along a given path to the focal plane;
   an exposure control mechanism for defining an exposure interval;
   sensing means for evaluating radiation from said scene during the exposure interval, said sensing means including means for reducing the contribution of visible frequencies relative to other spectral frequencies to the evaluation during at least a portion of the exposure interval so as to reduce the effect on such evaluation of differences in reflectivity values between objects in the scene being evaluated; and
   means responsive to the sensing means for controlling non-illuminating functions of the image recording apparatus.

2. The apparatus of claim 1 further comprising means for producing a pulse of illumination directed at the scene, and wherein said means for reducing the contribution of visible frequencies is operative during the pulse of illumination.

3. The apparatus of claim 1 wherein the other frequencies are infrared frequencies.

4. The apparatus of claim 3 wherein the means for providing a reduction in contribution of visible frequencies includes means for providing a significant reduction in visible frequencies relative to other frequencies.

5. The apparatus of claim 1 wherein the means for providing a reduction in contribution of visible frequencies includes means for substantially excluding all contribution from visible frequencies during at least the one portion of the exposure interval.

6. The apparatus of claim 1 wherein the means for providing a reduction in contribution of visible frequencies includes means for blocking visible frequencies while evaluating infrared frequencies.

7. The system of claim 1 further comprising means for producing a pulse of illumination directed at the scene during a selected portion of the exposure interval, and wherein the relative reduction in evaluation of the visible spectral frequencies is during at least a significant portion of the time of the pulse of illumination.

8. Image recording apparatus comprising:
   means for mounting image recordable material at a given focal plane;
   means for directing image forming light rays from the scene along a given path to the focal plane;
   an exposure control mechanism for defining an exposure aperture and an exposure interval;
   sensing means for evaluating radiation from said scene during the exposure interval, said sensing means including means for reducing the contribution of visible frequencies relative to other spectral frequencies to the evaluation during at least one portion of the exposure interval so as to reduce the effect on such evaluation of differences in reflectivity values between objects in the scene being evaluated; and
   means responsive to the sensing means for controlling the exposure control mechanism.

9. The apparatus of claim 8 further comprising means for producing a pulse of illumination directed at the scene, and wherein said means for reducing the contribution of visible frequencies is operative during the pulse of illumination.

10. The apparatus of claim 8 wherein the other frequencies are infrared frequencies.

11. The apparatus of claim 10 wherein the means for providing a reduction in contribution of visible frequencies includes means for providing a significant reduction in visible frequencies relative to other frequencies.

12. The apparatus of claim 8 wherein the means for providing a reduction in contribution of visible frequencies includes means for substantially excluding all contribution from visible frequencies during at least the one portion of the evaluation period.

13. The apparatus of claim 8 wherein the means for providing a reduction in contribution of visible frequencies includes means for blocking visible frequencies while evaluating infrared frequencies.

14. A method of recording scene light on image recordable material comprising the steps of:
providing an exposure of the material by directing image forming light rays from a scene to the material during a given exposure interval;
evaluating radiation from the scene during said given exposure interval with a reduction in contribution to said evaluation of visible frequencies relative to other spectral frequencies during at least a portion of said evaluation so as to reduce the effect on said evaluation of differences in reflectivity values between scene objects; and
controlling the exposure step substantially exclusive of direct control of scene illumination in accordance with such evaluation.

15. The method of claim 14 wherein the other frequencies are infrared frequencies.

16. The method of claim 14 wherein said step of reducing the visible frequencies provides a significant reduction in visible frequencies relative to other frequencies during said portion of said evaluation.

17. The method of claim 16 wherein the step of reducing the visible contribution substantially excludes all visible frequencies.

18. A method of recording an image of a scene illuminated at least in part with artificial light, the method comprising the steps of:
providing an exposure of image recording material by directing image forming light rays from a scene along a given exposure path to the image recordable material;
directing artificial illumination at said scene during the exposure;
evaluating radiation of selected spectral frequencies from said scene essentially excluding frequencies in the visible range during at least a portion of said illumination directing step so as to reduce the effect on such evaluation of differences in reflectivity values between objects in the scene being evaluated; and
controlling the exposure step exclusive of said artificial illumination step in accordance with said evaluation to provide a suitable exposure.

19. A light system for use in recording an image of a scene, said system comprising:
means for illuminating a scene with transient illumination providing visible and non-visible illumination;
evaluating means for determining an evaluation value proportional to the illumination in the scene during at least a portion of the operation of said illuminating means, said evaluating means evaluating scene illumination, at least during said portion of the operation of said illuminating means, with a reduction in contribution to said evaluation value of visible illumination relative to said non-visible illumination so as to reduce the effect on said evaluation value of differences in reflectivity of objects in the scene; and
control means for controlling said illuminating means in accordance with said evaluation value.

20. The system of claim 19 wherein said evaluating means includes means for evaluating amounts of illumination in the scene during said portion with a reduction in contribution to said evaluation of visible illumination relative to said non-visible illumination, and for summing said evaluated amounts of illumination to determine said evaluation value.

21. The system of claim 19 wherein said non-visible illumination is infrared.

22. The system of claim 21 wherein said reduction in contribution of visible illumination relative to infrared illumination is significant.

23. The system of claim 19 wherein said illuminating means includes at least one given lamp unit for artificially illuminating a scene with transient illumination containing both said visible and non-visible illumination, and said control means includes means for controlling at least said one given lamp unit in accordance with said evaluation value.

24. The system of claim 23 wherein said non-visible illumination is infrared.

25. Apparatus for recording an image of a scene, said apparatus comprising:
means for directing image-forming light rays from a scene to a focal plane during an exposure interval for recording an image of said scene;
means for illuminating the scene during said exposure interval with transient illumination providing visible and non-visible illumination; and
evaluating means for determining an evaluation value proportional to the illumination in the scene during at least a portion of said interval for controlling said apparatus, said evaluating means evaluating scene illumination, at least during said portion of said interval, with a reduction in contribution to said evaluation value of visible illumination relative to said non-visible illumination so as to reduce the effect on said evaluation value of differences in reflectivity of objects in the scene.

26. The system of claim 25 wherein said evaluating means includes means for evaluating amounts of illumination in said scene with a reduction in contribution to said evaluation of visible illumination relative to said non-visible illumination and for summing the evaluated amounts of illumination to determine said evaluation value.

27. The system of claim 25 wherein said non-visible illumination is infrared.

28. The system of claim 27 wherein said reduction in contribution of visible illumination relative to said infrared is significant.

29. The system of claim 28 wherein said reduction is such that said evaluation value is more dependent upon infrared than visible illumination.

30. The system of claim 27 wherein said illuminating means includes at least one given lamp unit for artificially illuminating a scene with transient illumination containing both visible illumination and non-visible illumination, and said apparatus includes control means for controlling at least said one given lamp unit in accordance with said evaluation value.

31. The system of claim 30 wherein said reduction is such that said evaluation value is more dependent upon infrared illumination than visible.

32. Apparatus for recording an image of a scene, said apparatus comprising:
  means for illuminating the scene with transient illumination providing at least non-visible illumination;
  means for directing image-forming light rays from a scene to a focal plane during an exposure interval for recording an image of said scene; and
  evaluating means for determining an evaluation value related to the illumination in said scene for controlling said apparatus, said evaluating means evaluating illumination in said scene during at least a portion of the operation of said illuminating means with a reduction in contribution to said evaluation of visible illumination relative to non-visible illumination and summing said evaluated amounts of illumination to determine said evaluation value.

33. The apparatus of claim 32 wherein said non-visible ilumination is infrared.

34. The apparatus of claim 33 wherein said reduction in contribution of visible illumination relative to infrared illumination is significant.

35. The apparatus of claim 33 wherein said control means controls said illuminating means to direct a given amount of visible illumination at said scene during said exposure interval in accordance with said summed evaluation value, said summed evaluation value is a time period determined in accordance with said summing of said evaluated amounts of illumination, and said apparatus includes control means for maintaining operation of said illuminating means for a given time proportional to said time period.

36. A method of defining an amount of transient visible illumination to be directed at a scene for image recording, said method comprising the steps of:
  illuminating the scene by directing transient illumination containing at least non-visible illumination at the scene;
  determining an evaluation value proportional to the illumination in the scene during at least a portion of said illumination step, said determining step evaluating scene illumination during said portion with a reduction in contribution to said evaluation value of visible illumination relative to non-visible illumination so as to reduce the effect on said value of differences in reflectivity of objects in said scene; and
  controlling the amount of transient visible illumination to be directed at said scene during image recording in accordance with said value.

37. The method of claim 36 wherein said non-visible illumination is infrared.

38. The method of claim 37 wherein said illumination step includes operating a given lamp unit to illuminate the scene with transient illumination containing both visible illumination and infrared illumination, and said controlling step controls said illumination step to provide a select amount of illumination from said given lamp during image recording in accordance with said determined evaluation value.

39. The method of claim 37 wherein said determining step includes evaluating illumination in said scene with a significant reduction in the contribution of visible illumination relative to infrared illumination.

40. The method of claim 39 wherein said determining step essentially excludes evaluation of visible illumination.

41. The method of claim 39 wherein said determining step includes summing each evaluated amount of illumination to determine said evaluation value.

42. The method of claim 41 wherein said summed value is determined as a time period and said control means maintains said directing step for a time proportional to said time period.

43. A method of recording an image of a scene illuminated at least in part by transient visible illumination, said method comprising the steps of:
  illuminating the scene by directing transient illumination containing at least non-visible illumination at the scene;
  determining an evaluation value proportional to at least non-visible illumination in the scene during at least a portion of said illumination step for control of said recording, said determining step including the steps of evaluating amounts of scene illumination during said portion with a reduction in contribution to said evaluation value of visible illumination relative to non-visible illumination so as to reduce the effect on said value of differences in reflectivity of objects in said scene, and summing said evaluated amounts to determine said evaluation value; and
  directing image-forming light rays from the scene to a focal plane during an exposure interval for recording an image of said scene.

44. The method of claim 43 wherein said non-visible illumination is infrared.

45. The method of claim 44 wherein said determining step includes evaluating illumination in said scene with a significant reduction in the contribution of visible illumination relative to infrared illumination.

46. The method of claim 45 wherein said determining step essentially excludes evaluation of visible illumination.

47. The method of claim 45 wherein said determining step includes summing each evaluated amount of illumination to determine said evaluation value in accordance with the resulting summed value.

* * * * *